(12) United States Patent
Maruo

(10) Patent No.: US 8,482,818 B2
(45) Date of Patent: Jul. 9, 2013

(54) IMAGE READING APPARATUS, CONTROL METHOD THEREFOR, AND PROGRAM

(75) Inventor: Masaru Maruo, Tokyo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 299 days.

(21) Appl. No.: 12/849,363

(22) Filed: Aug. 3, 2010

(65) Prior Publication Data

US 2011/0043873 A1 Feb. 24, 2011

(30) Foreign Application Priority Data

Aug. 19, 2009 (JP) ................................. 2009-190396
Mar. 15, 2010 (JP) ................................. 2010-058272
Jun. 18, 2010 (JP) ................................. 2010-139932

(51) Int. Cl.
*H04N 1/04* (2006.01)
*H04N 1/60* (2006.01)

(52) U.S. Cl.
USPC .......................................... 358/475; 358/1.9

(58) Field of Classification Search
USPC ........................................................ 358/475
See application file for complete search history.

(56) References Cited

U.S. PATENT DOCUMENTS

| | | | |
|---|---|---|---|
| 2004/0233478 A1* | 11/2004 | Ishido et al. | 358/449 |
| 2008/0198426 A1* | 8/2008 | Yokochi | 358/486 |
| 2009/0080031 A1* | 3/2009 | Ishido et al. | 358/449 |
| 2010/0253983 A1* | 10/2010 | Bin et al. | 358/475 |

FOREIGN PATENT DOCUMENTS

JP 2007-028413 A 2/2007

* cited by examiner

*Primary Examiner* — Twyler Haskins
*Assistant Examiner* — Henok Shiferaw
(74) *Attorney, Agent, or Firm* — Fitzpatrick, Cella, Harper & Scinto

(57) ABSTRACT

There is provided an image reading apparatus and a control method therefor, which can suppress the influence of external light, and obtain an appropriate read image. To accomplish this, the image reading apparatus executes a Light-on reading processing for turning on an LED and causing a sensor to read an original document on a original platen at the first resolution, and a Light-off reading processing for turning off a light source and causing the sensor to read the original document on the original platen at the second resolution. In accordance with the influence of external light in an Light-off mode image read by the Light-off reading processing, the image reading apparatus removes the influence of external light in a Light-on mode image read by the Light-on reading processing.

20 Claims, 9 Drawing Sheets

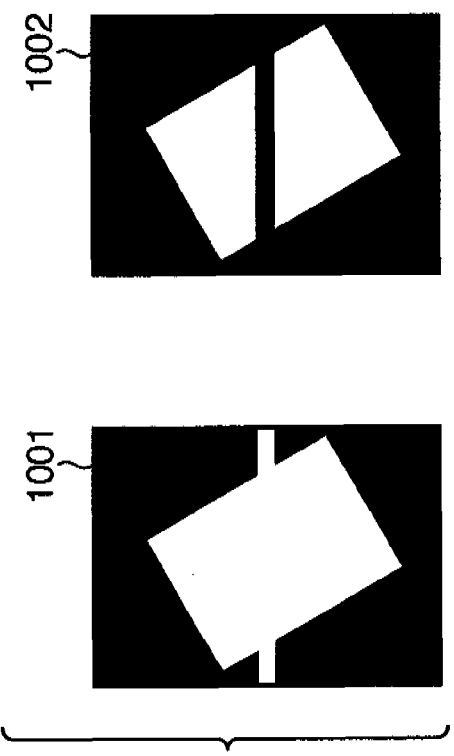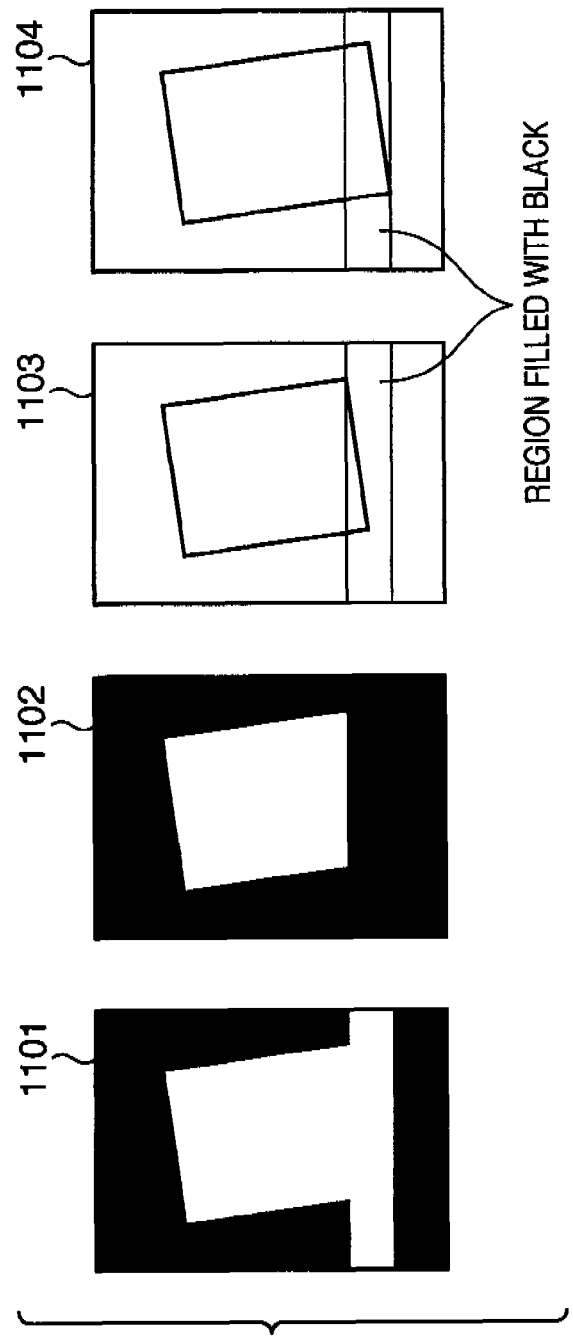
FIG. 10
FIG. 11

IMAGE READING APPARATUS, CONTROL METHOD THEREFOR, AND PROGRAM

BACKGROUND OF THE INVENTION

1. Field of the Invention

The present invention relates to an image reading apparatus, a control method therefor, and a program in, for example, a scanner.

2. Description of the Related Art

As an image reading apparatus, there is known a flatbed scanner, which emits by a light source such as an LED within a original platen constituted by a transmitting member, light toward an original document placed on the original platen, and reads reflected light using a sensor such as a CIS. Such an image reading apparatus reads a whole original document by moving the sensor, and outputs a read image as image data.

The flatbed scanner removes the influence of external light using a cover for covering the original platen so that external light is not reflected on an image to be output. An operator, however, needs to close the cover after placing an original document. For this reason, reading many original documents requires considerable time and labor. Furthermore, if an original document placed on the original platen is too thick to close the cover, it is necessary to read the original document with the cover open. If, however, the original document is read with the cover open, a reflection of external light exists in an image to be output which receives the influence of the external light, as shown in FIG. 12. In this case, the image reading apparatus may not be able to correctly detect a document size.

Japanese Patent Laid-Open No. 2007-28413 proposes an image reading apparatus that reduces the influence of external light by using data which has been read line by line by turning on a light source, and data which has been read line by line by turning off the light source. More specifically, Japanese Patent Laid-Open No. 2007-28413 proposes a technique which uses, as a mask pattern, the data that has been read by turning off the light source to perform mask processing on the data which has been read by turning on the light source. With this technique, the image reading apparatus of Japanese Patent Laid-Open No. 2007-28413 reduces the influence of external light experienced when reading an image with the cover closed.

The above conventional technique, however, has the following problems. For example, in the technique described in Japanese Patent Laid-Open No. 2007-28413, it is necessary to read each line twice. It takes, therefore, twice the usual time to perform the reading operation, thereby decreasing the productivity. Furthermore, even if external light is reflected when reading data by turning on an LED, external light is not necessarily reflected on the same place when reading the data by turning off the LED, depending on the flicker of external light, and it may be impossible to correctly remove the reflection of external light.

SUMMARY OF THE INVENTION

The present invention enables realization of an image reading apparatus and a control method therefor, which can suppress the influence of external light, and obtain an appropriate read image.

One aspect of the present invention provides an image reading apparatus comprising: a original platen on which an original document is placed; a light source that emits light toward the original document on the original platen; a sensor that reads an image of the original document on the original platen; a reading unit that executes a Light-on reading processing for turning on the light source and causing the sensor to read the original document on the original platen at a first resolution, and a Light-off reading processing for turning off the light source and causing the sensor to read the original document on the original platen at a second resolution; an image processing unit that removes an influence of external light included at a reading position outside the original document in a Light-on mode image read by the Light-on reading processing, in accordance with an influence of external light included at a reading position outside the original document in a Light-off mode image read by the Light-off reading processing; and a specifying unit that specifies a boundary between the inside and outside of the original document on the original platen based on the Light-on mode image in which the image processing unit has removed the influence of external light.

Another aspect of the present invention provides a control method for an image reading apparatus, comprising: executing a Light-on reading processing for turning on a light source which emits light toward an original document on a original platen and causing a sensor to read an image of the original document on the original platen at a first resolution, and a Light-off reading processing for turning off the light source and causing the sensor to read the original document on the original platen at a second resolution; removing an influence of external light included at a reading position outside the original document in a Light-on mode image read by the Light-on reading processing, in accordance with an influence of external light included at a reading position outside the original document in a Light-off mode image read by the Light-off reading processing; and specifying a boundary between the inside and outside of the original document on the original platen based on the Light-on mode image in which the influence of external light has been removed in the removing step.

Still another aspect of the present invention provides a computer-readable storage medium storing a computer program for causing a computer or a control unit of an image reading apparatus to execute the control method for the image reading apparatus.

Further features of the present invention will be apparent from the following description of exemplary embodiments with reference to the attached drawings.

BRIEF DESCRIPTION OF THE DRAWINGS

FIG. 10 is a view that depicts image processing executed by the image processing unit according to the second embodiment;

FIG. 11 is a view that depicts image processing executed by the image processing unit according to the second embodiment;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Hardware Arrangement of Image Reading Apparatus

Figure 1:
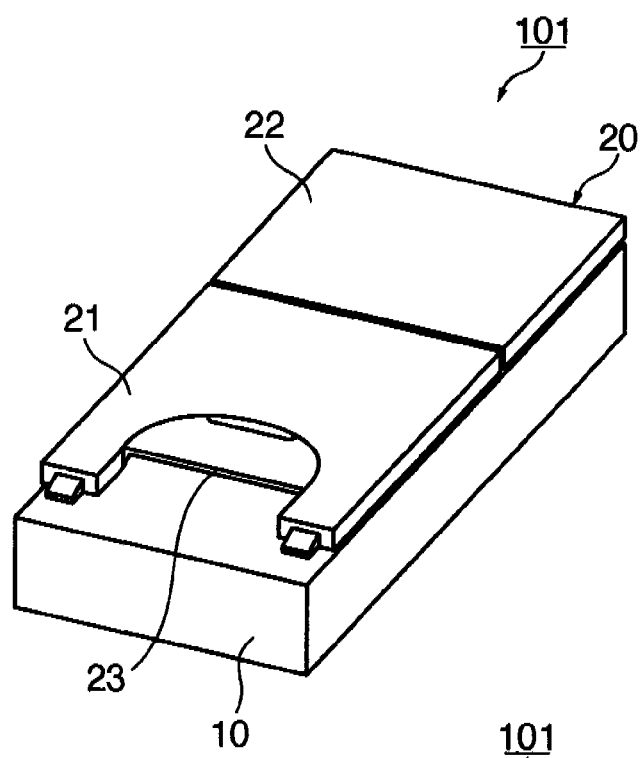
FIG. 1 is a perspective view that depicts the outer appearance of an image reading apparatus with its opening/closing cover closed according to the first embodiment.
Figure 2:
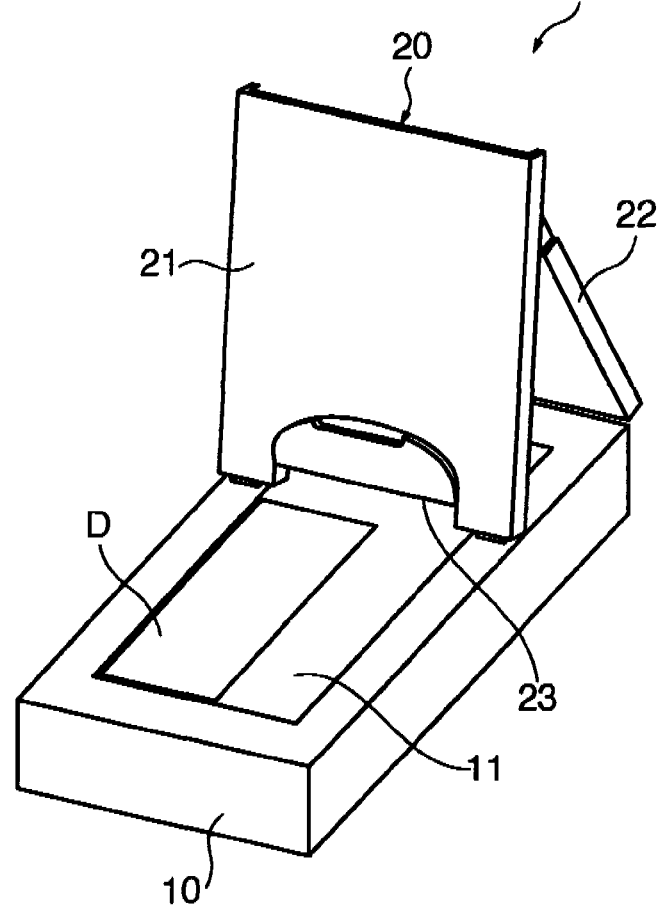
FIG. 2 is a perspective view that depicts the outer appearance of the image reading apparatus with its opening/closing cover open according to the first embodiment.

The first embodiment of the present invention will be described below with reference to FIGS. 1 to 8. FIGS. 1 and 2 are perspective views that each depict the outer appearance of an image reading apparatus according to the first embodiment. In this embodiment, an image reading apparatus 101 will be explained by exemplifying a flatbed scanner. FIG. 1 shows a state in which an opening/closing cover 20 is closed. FIG. 2 shows a state in which the opening/closing cover 20 is open. Note that reference symbol D in FIG. 2 denotes an original document placed on a original platen 11.

The image reading apparatus 101 has a lower unit 10 and the opening/closing cover 20. The opening/closing cover 20 includes a front cover 21 and a rear cover 22, and is attached to the lower unit 10 so as to be openable/closeable, as shown in FIGS. 1 and 2. The front cover 21 has a concave-shaped front end portion 23. The opening/closing cover 20 of the image reading apparatus 101 in the embodiment is foldable. More specifically, the opening/closing cover 20 is foldable in a direction in which the surfaces of the front cover 21 and rear cover 22 to be in contact with the original document D (the surfaces which are in contact with the original document D, and opposite to the original platen 11 in a closed state) come close to each other. This can improve the operability of opening/closing the opening/closing cover 20, and safety in use. In the embodiment, the opening/closing cover 20 is held at one or a plurality of positions set on the lower unit 10 in a predetermined folded state. Furthermore, it is possible to insert an original document such as a booklet from a gap between the concave-shaped front end portion 23 and the original platen 11. The opening/closing cover 20 is provided so that the end portion of the front cover 21 is slidable on the lower unit 10 along the original platen 11 without moving the original document inserted through the front end portion 23. The image reading apparatus 101 having the opening/closing cover 20 will be explained as an example here. The present invention, however, is not limited to this. For example, the opening/closing cover 20 may be omitted, and the present invention is applicable to an image reading apparatus in a form (with a structure) which receives the influence of external light in reading the original document D.

As shown in FIGS. 1 and 2, the image reading apparatus 101 according to the embodiment can read an original document in a state in which the opening/closing cover 20 is closed or open. When the opening/closing cover 20 is open, however, the apparatus 101 receives the influence of external light. The influence of external light appears at a reading position outside the original document placed on the original platen 11. The image reading apparatus 101 specifies a boundary between the inside and outside of the original document by processing read image data by a method to be described later to reduce the influence of external light while suppressing a decrease in reading speed.

Figure 3:
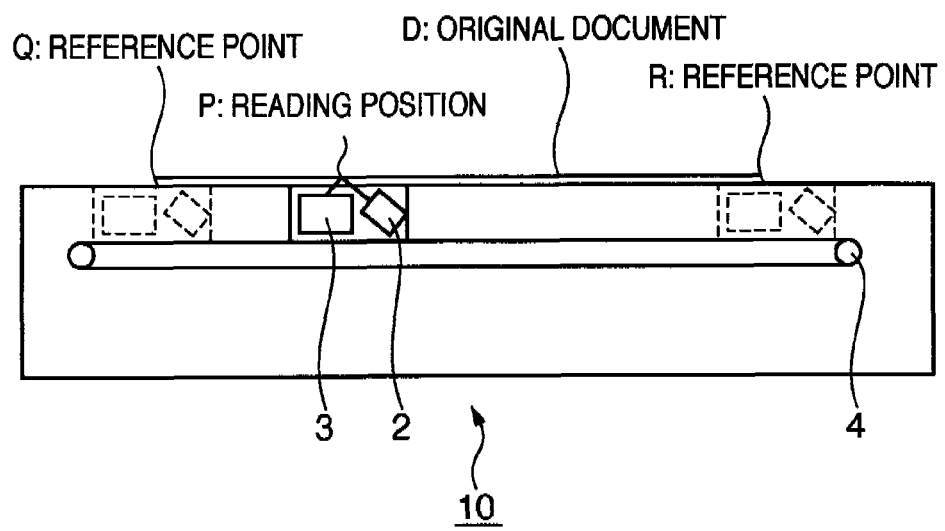
FIG. 3 is a view that depicts an example of the arrangement of a lower unit according to the first embodiment.

With reference to FIG. 3, the detailed arrangement of the lower unit 10 will be described next. The lower unit 10 serves as a reading unit for reading the original document D. The lower unit 10 includes the original platen 11, an LED 2, a sensor 3, and a driving unit 4. The original platen 11 is used for placing an original document to be read, and its upper portion is made of glass which transmits light. The LED 2 emits light toward an original document placed on the original platen 11. The sensor 3 reads the incident light. The sensor 3 serves as a line sensor which reads an image line by line in the main scan direction, and can read the whole original document by being driven in the sub-scan direction. Note that the incident light includes external light, and reflected light obtained when light emitted by the LED 2 is reflected by an original document or the like. The LED 2 and the sensor 3 are positioned at a reference point Q until reading operation starts, and are driven by the driving unit 4 between the reference point Q and a reference point R when reading the original document.

<Control Configuration of Image Reading Apparatus>

Figure 4:
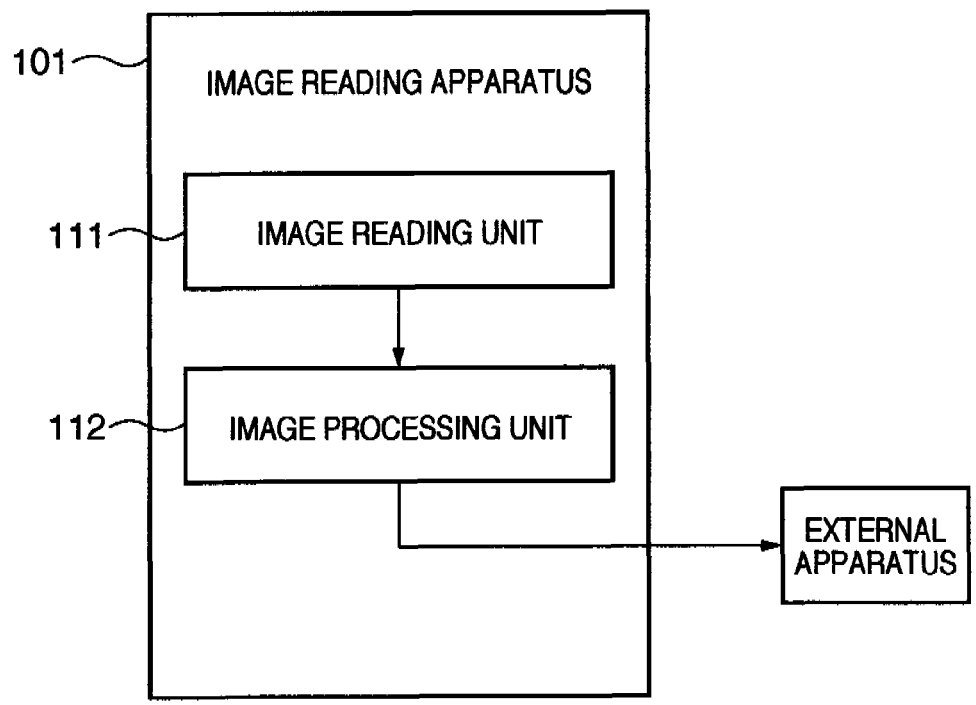
FIG. 4 is a block diagram that depicts the control configuration of the image reading apparatus according to the first embodiment.

With reference to FIG. 4, the control configuration of the image reading apparatus 101 in the embodiment will now be described. The image reading apparatus 101 includes an image reading unit 111 and an image processing unit 112. The image reading unit 111 reads an image from an original document, and outputs the read image data to the image processing unit 112. The image processing unit 112 executes processing on the image data input by the image reading unit 111, and outputs the processed data to the outside (for example, an external apparatus).

<Reading Processing>

Document reading processing executed by the image reading unit 111 will be explained using FIG. 3. The image reading unit 111 uses an ON reading mode (Light-on reading processing: actual scan) in which the LED 2 is turned on, and an OFF reading mode (Light-off reading processing: prescan) in which the LED 2 is turned off to read an original document, and transfers both the read images to the image processing unit 112.

First, the reading processing in the ON reading mode will be described. Upon start of the reading processing, the image reading unit 111 turns on the LED 2 at the position of the reference point Q, and causes the sensor 3 to read reflected light and external light. While performing this reading operation, the unit 111 uses the driving unit 4 to move the LED 2 and the sensor 3 toward the reference point R by a distance corresponding to one pixel. The unit 111 repeats this operation until the LED 2 and the sensor 3 reach the position of the reference point R, thereby reading the whole original platen 11, and outputting the read data for subsequent processing.

Next, the reading processing in the OFF reading mode will be explained. Upon completion of the reading processing in the ON reading mode, the LED 2 and the sensor 3 are positioned at the reference point R. The image reading unit 111 turns off the LED 2 which has been ON in the ON reading mode, and causes the sensor 3 to read external light. While performing this reading operation, the unit 111 uses the driving unit 4 to move the LED 2 and the sensor 3 toward the reference point Q by a distance corresponding to one pixel. The unit 111 repeats this operation until the LED 2 and the sensor 3 reach the position of the reference point Q, thereby reading the whole original platen, and outputting the read data for subsequent processing.

In the embodiment, a resolution (the second resolution) in the OFF reading mode is set to be lower than that (the first resolution) in the ON reading mode. That is, in the ON reading mode, the reading operation is performed at a high resolution for which the reading speed is low. In the OFF reading mode, the reading operation is performed at a low resolution for which the reading speed is high. Controlling in this way can shorten the time required by the image reading apparatus 101 to read an original document. The present invention is not limited to this, as a matter of course. The second resolution may be as high as or higher than the first resolution.

<Image Processing>

Figure 5:
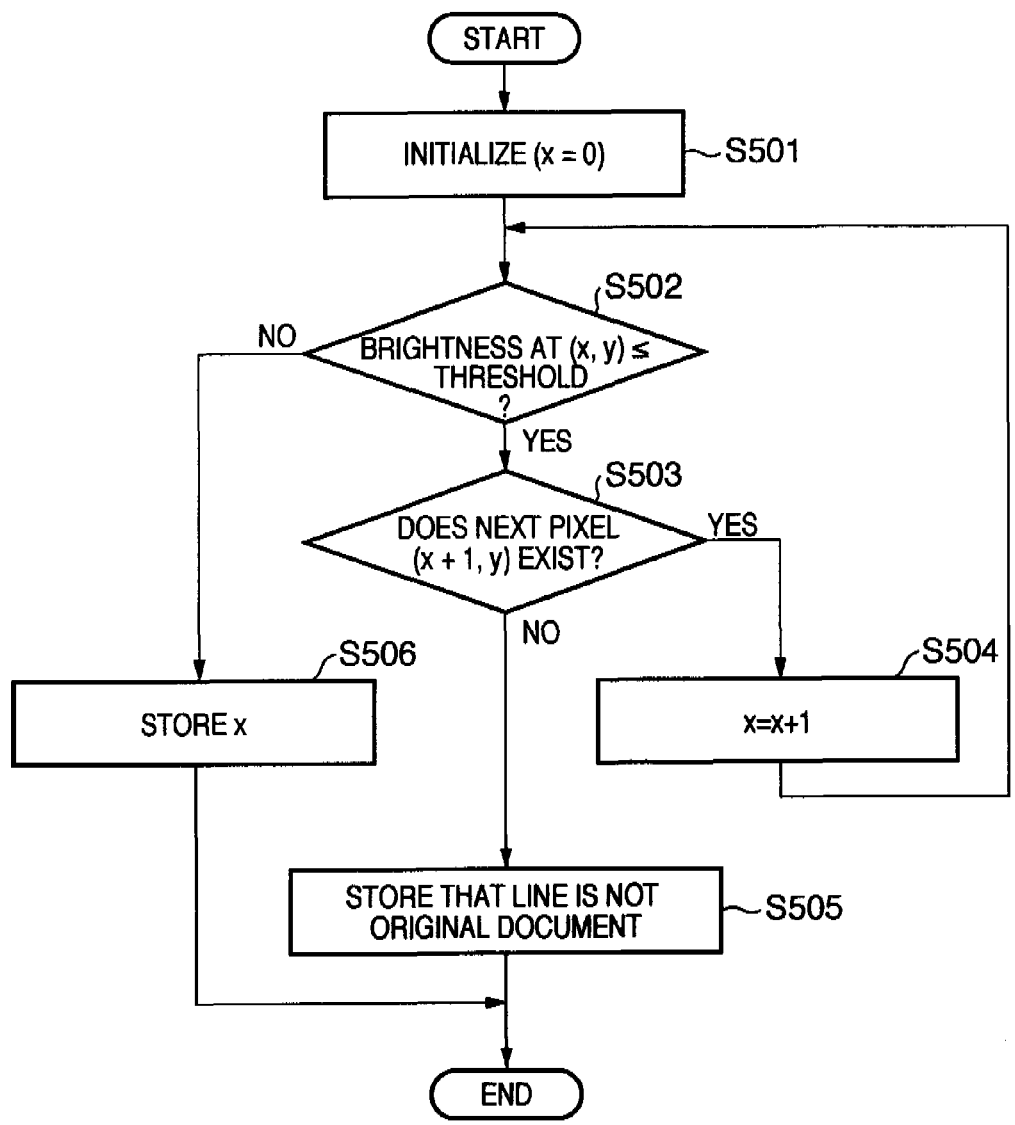
FIG. 5 is a flowchart illustrating the control procedure of an image processing unit according to the first embodiment.
Figure 6:
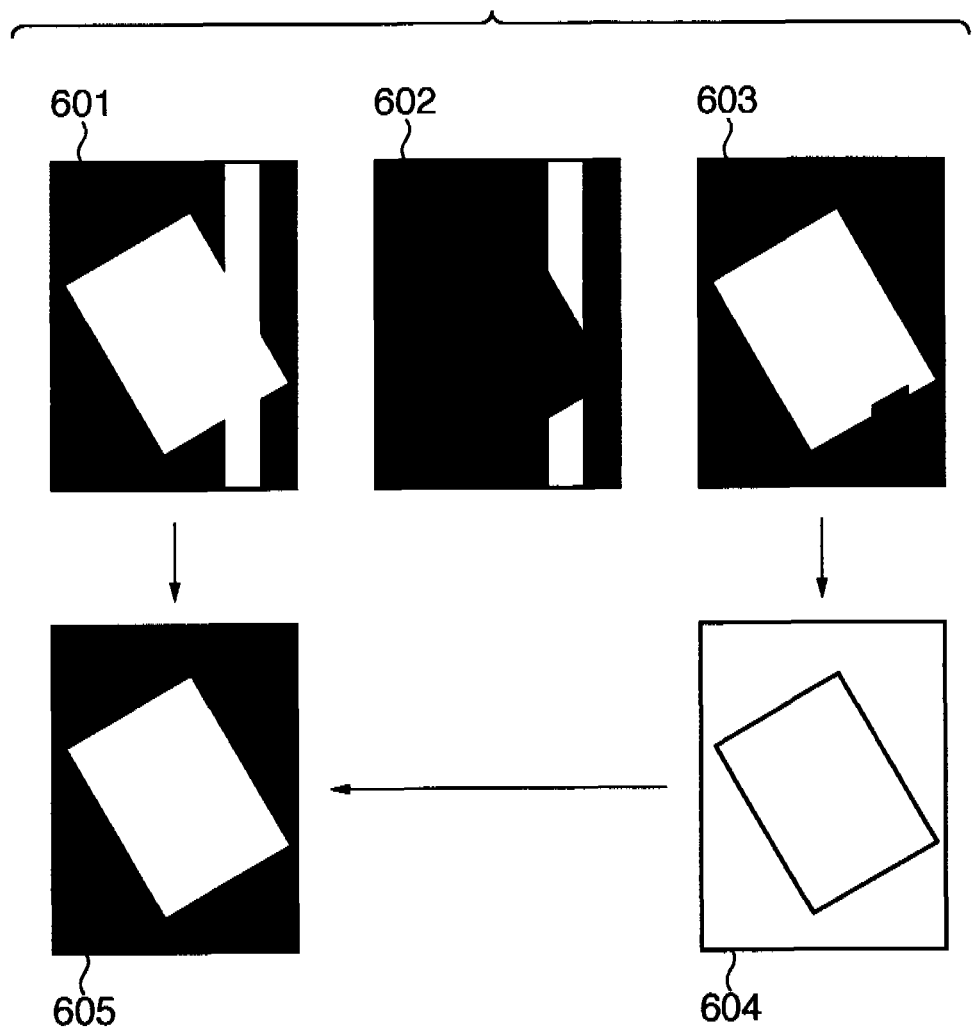
FIG. 6 is a view that depicts image processing executed by the image processing unit according to the first embodiment.

With reference to FIGS. 5 and 6, image processing which is executed by the image processing unit 112 for image data read by the image reading unit 111 will be described. FIG. 5 is a flowchart illustrating the control procedure of the image processing unit 112 according to the embodiment. FIG. 6 is a view that depicts the image processing executed by the image processing unit 112 in the embodiment.

Referring to FIG. 6, an image 601 serves as an image (Light-on mode image) which has been read in the ON reading mode, and output from the image reading unit 111. An image 602 serves as an image (Light-off mode image) which has been read in the OFF reading mode, and output from the image reading unit 111. As can been seen in the images 601 and 602, each read image has received the influence of external light at a reading position outside an original document. An image 603 is used for detecting the position and size of the original document, and is output using the images 601 and 602. An image 604 is obtained as a result of specifying, based on the image 603, a boundary between the inside and outside of the original document on the original platen to identify a document region, that is, detecting, for example, the position and size of the original document. An image 605 is output from the image processing unit 112.

The image processing unit 112 creates an image by performing resolution conversion on the image 601 so that the image 601 has the same resolution as that of the image 602. As described above, since the image 602 has a resolution lower than that of the image 601, the resolution conversion performed on the image 601 is enlargement processing. After that, the image processing unit 112 uses the image 602 as a mask pattern to execute mask processing on the image 601 which has undergone the resolution conversion. The mask processing examines the coordinates of a pixel having brightness equal to or higher than a threshold in the image 602. That is, in the embodiment, the processing checks the coordinates of a pixel which has received the influence of external light. The threshold is predetermined to be a value for a case in which external light has an influence. For the investigated coordinates, the image processing unit 112 then changes the data of a corresponding pixel in the image 603 to, for example, a value indicating black. That is, in this embodiment, the unit 112 removes the influence of external light included at the reading position outside the original document by filling the data of the corresponding pixel with black. Executing this processing on the whole image creates the image 603.

Since the image 601 in the ON reading mode and the image 602 in the OFF reading mode are individually read, a shift to some extent between the coordinates in both the images is created. Therefore, when outputting the image 603, the influence of external light may remain, or a portion near the external light in the image 601 may be lost. To remove such noise, the image processing unit 112 obtains a document size using the image 603.

Processing for obtaining a document size will now be explained with reference to FIG. 5. In step S501, the image processing unit 112 initializes a coordinate x of a pixel to be processed to 0. This makes it possible to start the processing from an end portion of a line in the main scan direction in the image 603.

In step S502, the image processing unit 112 determines whether the brightness of the pixel of interest is equal to or lower than a threshold. If the brightness is equal to or lower than a threshold, the process advances to step S503, in which the image processing unit 112 determines whether the next pixel data (coordinates: x+1, y) exists. If there exists the next pixel data, the image processing unit 112 increments x by 1 in step S504, and returns the process to step S502.

On the other hand, if the unit 112 determines in step S503 that the next pixel does not exist, the process advances to step S505, in which the image processing unit 112 stores the fact that a line currently processed does not include the original document. The unit 112 then ends the processing. If the unit 112 determines in step S502 that the brightness is higher than the threshold, the process advances to step S506, in which the image processing unit 112 stores the coordinate at this time. The unit 112 then ends the processing.

The image processing unit 112 according to the embodiment also executes the above processing from the other end portion of the line in the main scan direction, and detects the two end portions of the original document. It is possible to measure the rough shape of the original document by performing the line processing for all lines in the main scan direction. After that, the unit 112 examines four outermost points in the main scan direction and the sub-scan direction. In a quadrangle obtained by connecting the four points, the unit 112 obtains a smallest rectangle containing the quadrangle with reference to the tilt of its longest side. Like the image 604, this enables to specify a boundary between the inside and outside of the original document on the original platen, and detect a document region, that is, measure the position, size, and the like of the original document.

Since the resolution of the image 604 is lower than that of the image 601, and the size of the image 604 is different from that of the image 601, the image processing unit 112 adjusts the size in accordance with the resolutions of the images 601 and 602. The image processing unit 112 then examines the outside of the original document D based on the result of detecting the document position and size with respect to the image 601, and changes a corresponding portion to, for example, data indicating black. As a result of performing the above processing on the whole image 601, the image 605 is obtained. Executing the above processing allows the image processing unit 112 to output the image 605 in which the influence of external light, especially the influence of external light included at a reading position outside the original document is removed.

As described above, an image reading apparatus according to the embodiment executes Light-on reading processing for turning on an LED and causing a sensor to read an original document placed on a original platen at the first resolution, and Light-off reading processing for turning off a light source and causing the sensor to read the original document placed on the original platen at the second resolution lower than the first resolution. In accordance with the influence of external light in a Light-off mode image read by the Light-off reading processing, the image reading apparatus removes the influence of external light in a Light-on mode image read by the Light-on reading processing. "Removing the influence of external light" indicates removing an influence (an influence caused by a change in external light in a fluorescent lamp or the like) received from external light incident on a region which falls within a reading region including the original document on the original platen, and falls outside the original document. More specifically, this means excluding a portion (region) including the influence of external light incident directly on the sensor outside the original document from a read image containing the image of the original document, and includes replacing the region outside the original document with a predetermined image. "Outside the original document" includes not only an outer region as a boundary between the inside and outside of the original document but also hole (punched hole) portions for, for example, a binder, within the original document. If the original document includes holes, the above-described image processing of the present invention can remove the influence of external light on the hole portions. This makes it possible to specify the hole portions, and to reliably execute subsequent hole removal processing (for example, processing for detecting a characteristic portion such as the shape of a hole, and replacing a hole image with a background color (for example, white) of the original document).

Based on the image with the influence of external light removed, the image reading apparatus specifies the region of the original document placed on the original platen, more specifically, the position and size of the original document, and the like. This allows the image reading apparatus to obtain an appropriate image while decreasing the influence of external light when reading the original document. By setting the resolution (reading density) in the Light-off reading processing to be lower than that in the Light-on reading processing, the image reading apparatus can suppress a decrease in reading speed, and recognize the correct size and position of the original document.

The image reading apparatus converts the Light-on mode image having the first resolution to an image having the second resolution before removing the influence of external light from the Light-on mode image. This makes it possible to remove a difference between document positions in the ON and the Light-off mode images due to a difference in resolution. The image reading apparatus may perform adjustment in accordance with the difference between the first and second resolutions when specifying the position and size of the original document. This enables the image reading apparatus to determine the more correct position and size of the original document.

<Modification>

A modification of the embodiment will be explained below. The present invention is not limited to the above embodiment, and various modifications are possible. For example, although an original document is read in the order of the ON reading mode and the OFF reading mode in the embodiment, the order may be reversed. In either case, it is possible to obtain the same effects as in the above-described embodiment. Image extraction processing or rotation processing may be executed based on the position and size of the original document obtained in the embodiment. Although the resolution conversion is performed on the image 601 to have the same resolution as that of the image 602 in the embodiment, it may be executed on the image 602 to have the same resolution as that of the image 601. This removes the need of performing, after the image 604 is created, conversion according to the resolution on the image 604 so as to set its document size to be the same as that of the image 601.

Figure 13:
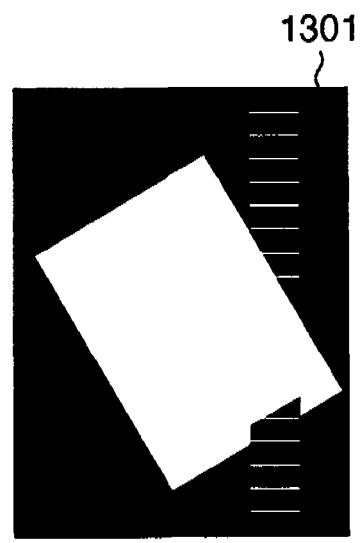
FIG. 13 is a view that depicts a read image which has received the influence of flicker.

Although not executed in the embodiment, softening processing may be executed on the image 602 read in the OFF reading mode, and then mask processing may be performed on the image 603. For example, the mask processing may be executed on the image 603 after executing the softening processing or processing for performing correction by detecting a region in which the brightness increases/decreases at a given frequency in the sub-scan direction, and the frequency, and using the inverse function of the frequency. Note that the softening processing indicates processing for decreasing a data difference between neighboring pixels. There may be a shift between the position of external light in the image read in the ON reading mode, and that of external light in the image read in the OFF reading mode due to flicker. In this case, if the above-described mask processing is executed without taking any measures, an image like an image 1301 in FIG. 13 is generated as an image corresponding to the image 603. In contrast to this, it is possible to decrease the influence of flicker by enlarging a range which is changed to a value indicating black, and reducing an error in the mask processing. If processing for flicker is executed in the ON reading mode, it may be erroneously determined that there exists a region in an original document to be read, in which the brightness increases/decreases at a given frequency, and then correction may be performed. It is possible to execute processing without deteriorating the read image by performing the processing for flicker only on the image read in the OFF reading mode. More specifically, softening processing expressed by the following equation is executed before performing the mask processing.

brightness at (x, y) after correction=(brightness at (x, y) before correction*2+brightness at (x, y−1) before correction+brightness at (x, y+1) before correction)/4

Assume here that the main scan direction is the X direction, the sub-scan direction is the Y direction, and the coordinates of a pixel to be corrected are represented by (x, y).

Correction processing for flicker may be executed on the image 603 which has undergone the mask processing. For example, processing for filling a line which appears in the sub-scan direction at a given interval may be performed. FIG. 13 is a view that depicts an example in which the influence of external light remains after performing the mask processing. In FIG. 13, a range subjected to the mask processing is insufficient due to the influence of flicker, and lines appear at a predetermined interval. In contrast to this, it is possible to remove the influence of external light which remains due to the influence of flicker by detecting lines which appear at a given interval, and executing processing for filling the lines with black.

The correction processing for flicker may be performed on the image 601 before the mask processing is executed. For example, a region where the brightness increases/decreases in the sub-scan direction at a given interval may be detected, and filled with black. This can remove portions which have been detected as external light in advance, thereby more reliably reducing the influence of external light.

Figure 7:
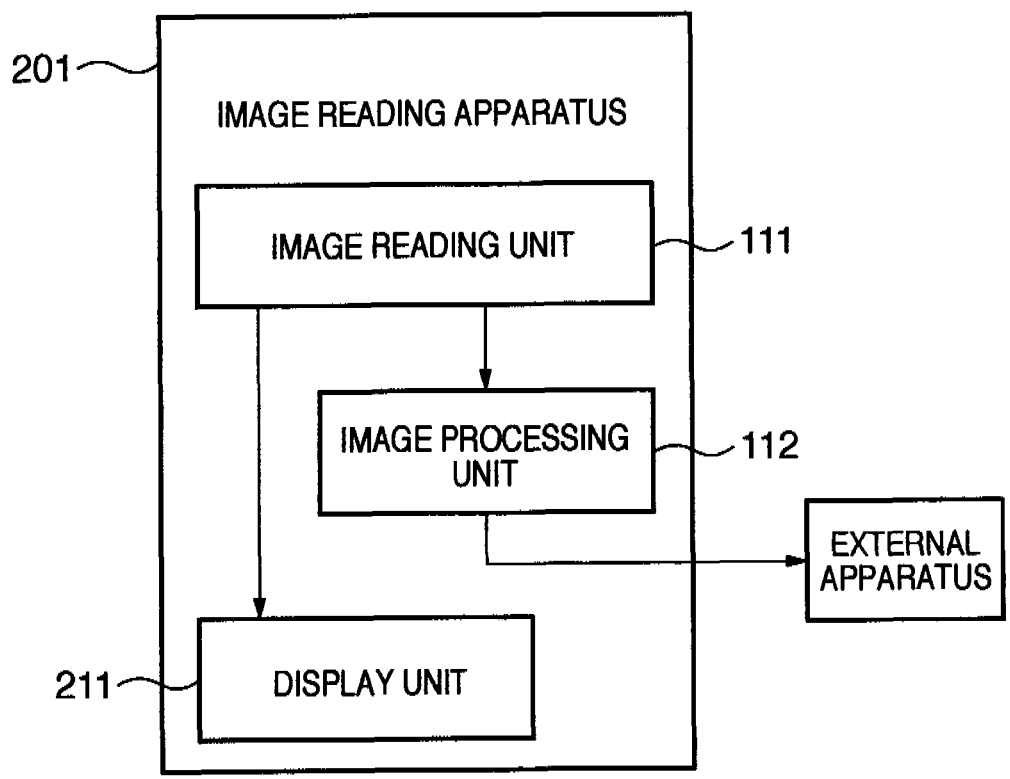
FIG. 7 is a block diagram that depicts the control configuration of the image reading apparatus according to a modification of the first embodiment.
Figure 8:
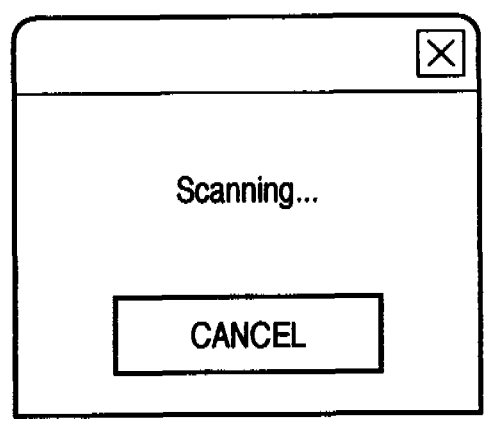
FIG. 8 is a view that depicts a display example of a display unit according to the modification of the first embodiment.

The operator of the image reading apparatus 101 may be notified that an original document is being read. This allows an image reading apparatus 201 to prevent the original document from being moved by the user while reading the original document. For example, while reading the original document in the OFF reading mode, the LED is OFF. The user may take this to mean that reading processing of the original document is complete, and may erroneously move the original document. This causes a shift of the position of the original document between the ON and OFF reading modes. To solve this problem, the image reading apparatus 201 may be configured as shown in FIG. 7.

The image reading apparatus 201 includes a display unit 211 in addition to the components of the image reading apparatus 101. When reading an image, the display unit 211 displays a message "scanning" shown in FIG. 8 to attract attention on, for example, a display from when document reading processing in the ON reading mode starts until document reading processing in the OFF reading mode completes.

In the embodiment, an image is always read in both the ON and OFF reading modes. As long as, however, it is possible to detect that there is no influence of external light, the control may switch to output an image read in the ON reading mode without any change. This control can improve the productivity of reading processing when the OFF reading mode is unnecessary.

In this case, for example, a sensor may be provided for detecting a state in which the opening/closing cover 20 for covering the original platen 11 is closed as shown in FIG. 1 or that in which the opening/closing cover 20 is open as shown in FIG. 2. If the opening/closing cover 20 is closed, an image which has been read in the ON reading mode may be output intact. If the user can specify image reading settings such as a reading region when reading an image, the control may be switched to execute reading processing in the two modes and then output a processed image, or to output an image read in the ON reading mode without any change, in accordance with the settings. If, for example, the user specifies a reading region in advance, an original document is read only in the ON reading mode in accordance with the reading region specified by the user, and is then output intact.

Although the image reading apparatus 101 includes the image processing unit 112 in the embodiment, the image processing may be executed using the image processing unit 112 outside the image reading apparatus 101. The image reading unit 111, for example, may read an image in each of the ON and OFF reading modes, output the images, and then execute image processing using an external apparatus such as a personal computer.

Although, in the above embodiment, the image reading apparatus 101 reads all region of the original platen 11 in the ON reading mode, the present invention cannot be limited to the above embodiment. For example, the image reading apparatus 101 may emit, in the ON reading mode, the light on a region corresponding to the region of the original document specified from the image read in the OFF reading mode. Thereby, the present invention can read the region of the original document using the minimum emitting, and then reduce power consumption.

Second Embodiment

Figure 9:
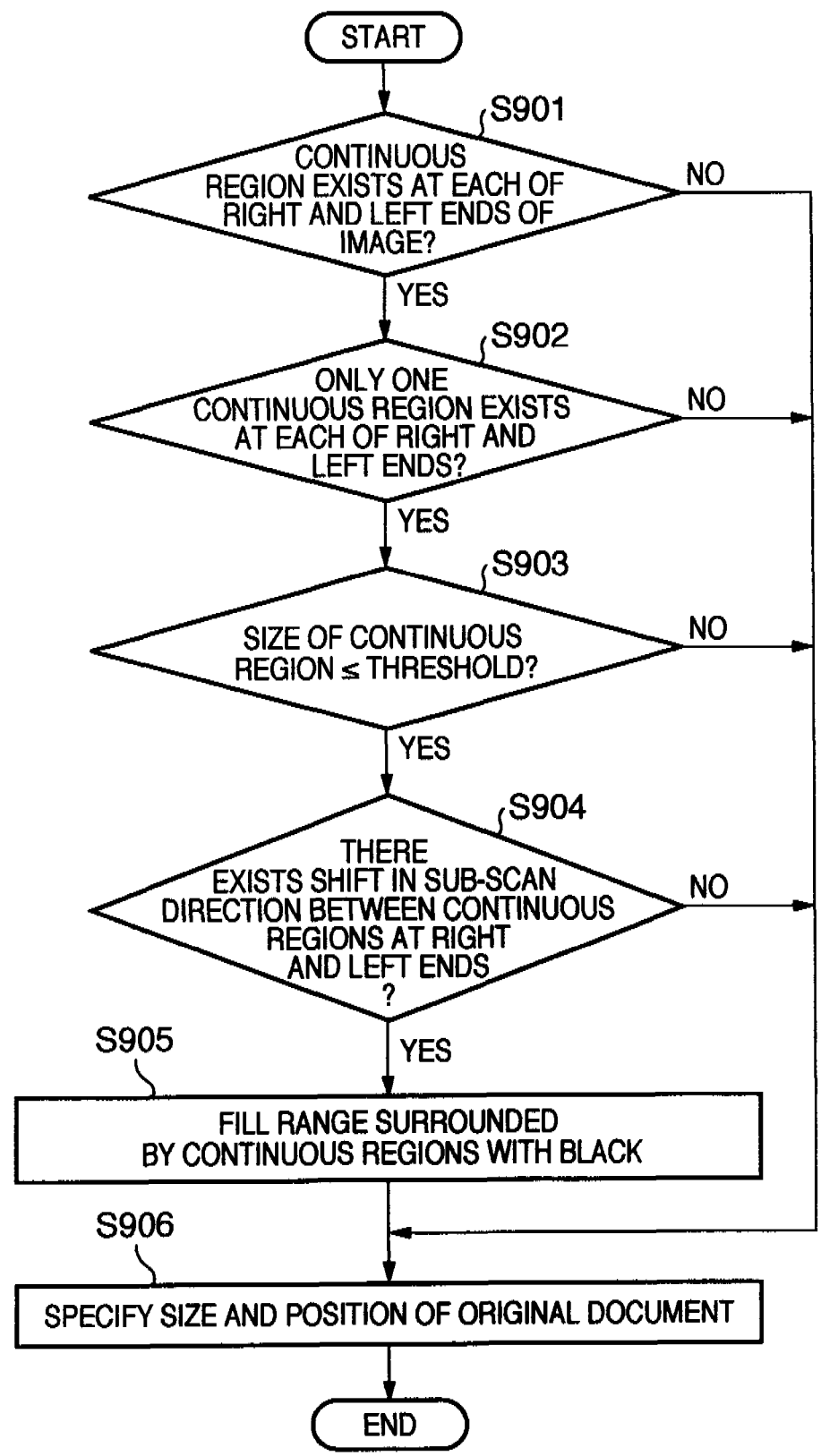
FIG. 9 is a flowchart illustrating the control procedure of an image processing unit according to the second embodiment.
Figure 12:
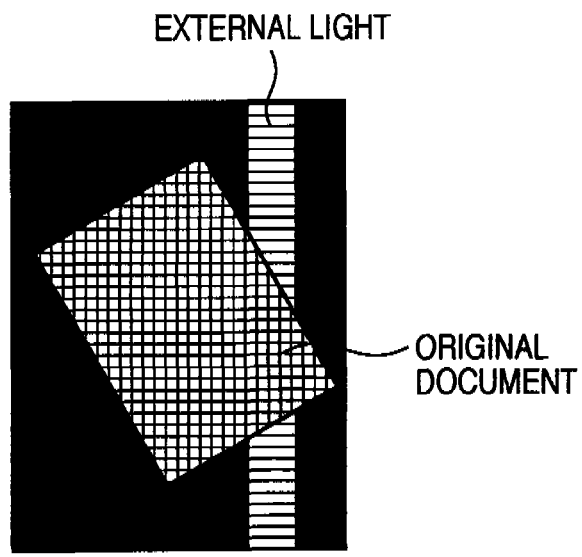
FIG. 12 is a view that depicts an example of an original document and external light in a read image.

The second embodiment will be explained below with reference to FIGS. 9 to 11. This embodiment is characterized by reducing an influence exerted by a front end portion 23 of a front cover 21 on a read image when reading an original document in a state in which an opening/closing cover 20 is open. FIG. 9 is a flowchart illustrating the control procedure of an image processing unit 112 according to this embodiment. FIG. 10 is a view that depicts image processing executed by the image processing unit 112.

An image 1001 shown in FIG. 10 is read by an image reading unit 111. More specifically, the image 1001 is obtained by reading an original document set across the end portion of the folded opening/closing cover (front cover). Reference numeral 1002 denotes an image in which the image processing unit 112 has partially changed data with a value indicating black. Assume that in an input image, the longitudinal direction is determined as the main scan direction, and the lateral direction is regarded as the sub-scan direction.

In step S901, when the image 1001 is input from the image reading unit 111, the image processing unit 112 determines whether, at each of the right and left ends of the image, there is a region in which a pixel having brightness equal to or higher than a predetermined threshold continuously exists upstream and downstream. Note that "upstream and downstream" indicates the sub-scan direction of a sensor 3. The predetermined threshold is set with a value for determining the possibility that a pixel has been read as an image. If there is no continuous region at the right or left end of the image, the process advances to step S906, in which the image processing unit 112 executes processing for specifying the size and position of the original document without any correction processing for the image.

If the image processing unit 112 determines that the continuous region exists at each of the left and right ends of the image, it determines in step S902 whether only one continuous region exists at each of the left and right ends of the image. If there are more than one continuous region at the left or right end of the image, the above-described processing in step S906 is executed.

Alternatively, if only one continuous region exists at each of the left and right ends of the image, the process advances to step S903, in which the image processing unit 112 determines whether each size of the continuous regions at the left and right ends is equal to or smaller than a threshold indicating a predetermined thickness. The threshold is a predefined value indicating the thickness of the front end portion 23 of the front cover 21. That is, the unit 112 determines whether the front end portion 23 has been read by the image reading unit 111. Note that the size of the continuous region represents the dimension in the sub-scan direction. If the size of any one of the continuous regions at the left and right ends is larger than the threshold, the above-described processing in step S906 is performed.

If both the sizes of the continuous regions at the left and right ends are equal to or smaller than the threshold, the process advances to step S904, in which the image processing unit 112 determines whether a shift between the coordinates in the upstream/downstream direction (sub-scan direction) in the continuous regions at the left and right ends is equal to or smaller than a predetermined threshold. The threshold is set with a value predefined according to an allowable inclination of the front cover 21. If the shift is larger than the threshold, the above-described processing in step S906 is executed.

Alternatively, if the shift is equal to or smaller than the threshold, the process advances to step S905, in which the image processing unit 112 changes, to a value indicating black, a portion sandwiched in the main scan direction between the continuous regions at the left and right ends. This generates an image 1002. In step S906, the image processing unit 112 detects a document position and size for the image 1002. This processing is the same as in the first embodiment. After that, based on the detected document position and size, the image processing unit 112 changes the whole portion outside the original document to a value indicating black for the image 1001, and then outputs the image. With the above processing, even if the front end portion 23 of the front cover 21 is reflected like the image 1001 read by the image reading unit 111, it is possible to correctly remove the reflection.

The processing in this embodiment can be executed in combination with the first embodiment. For example, if mask processing is executed using an image read in the ON reading mode, and that read in the OFF reading mode as in the first embodiment, the reflection of the front end portion 23 remains as in the image 1001. Therefore, as in the second embodiment, a continuous region may be detected, and a portion may be filled with black like the image 1002, thereby detecting a document size and position. In this case, based on the detected document position and size, processing for filling portions outside the original document with black is performed on the image input from the image reading unit 111.

Although processing is not especially executed for the end portions of the original document in this embodiment, if the end portions of the original document are included in the region which has been filled with black in step S905, the detected document size and position may be extended. More specifically, if two of the four outermost points of the original document are included in the filled region, with respect to a straight line formed by the two points, the two remaining points are translated so that one of the remaining points is positioned on the boundary of the filled region. This makes it possible to execute the processing without losing an end portion of the original document, even if the end portion is located at a place which is difficult to detect.

FIG. 11 shows an image when an end portion of an original document is included in a region filled with black. If the end portion of the original document is completely lost when generating an image 1102 from an image 1101, the end portion of the original document is not detected, and therefore, size information like an image 1103 is output. By enlarging a document region like an image 1104, it is possible to output the information without loss of the document region.

Third Embodiment

Figure 14:
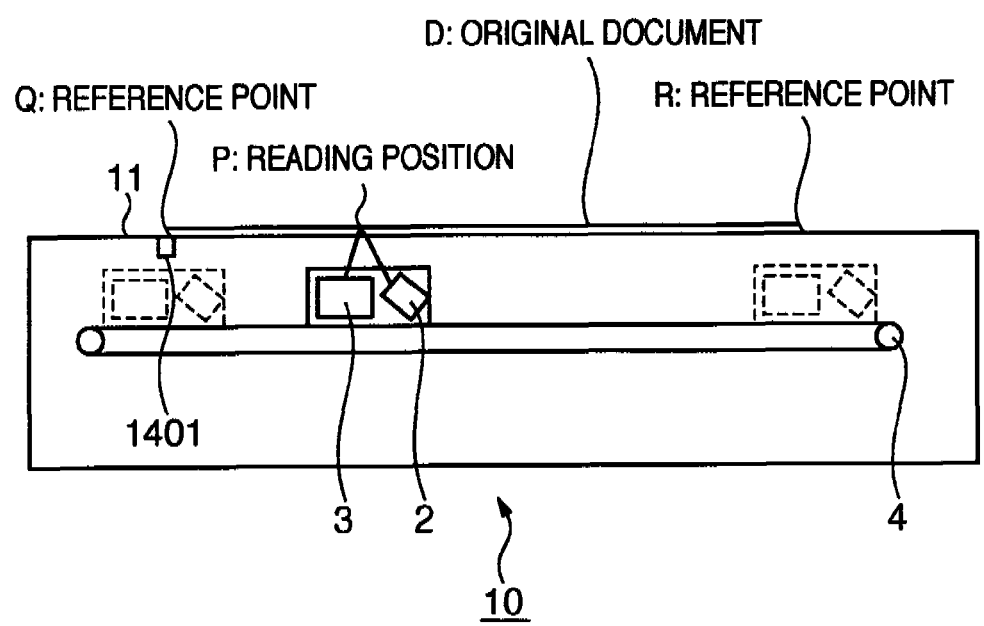
FIG. 14 is a view that depicts an example of the arrangement of a lower unit according to the third embodiment.
Figure 15:
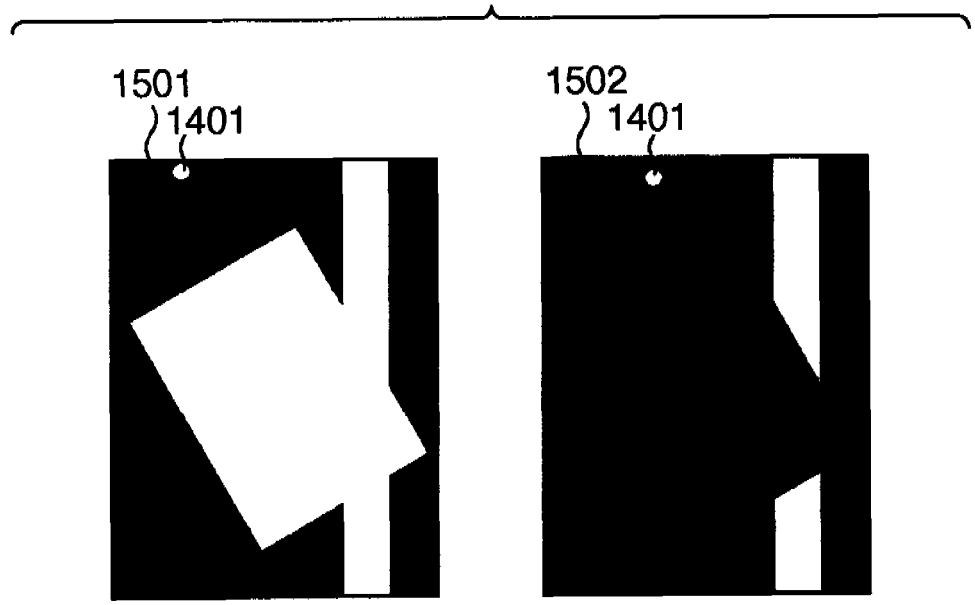
FIG. 15 is a view that depicts an image read by turning on a light source 1401 according to the third embodiment.
Figure 16:
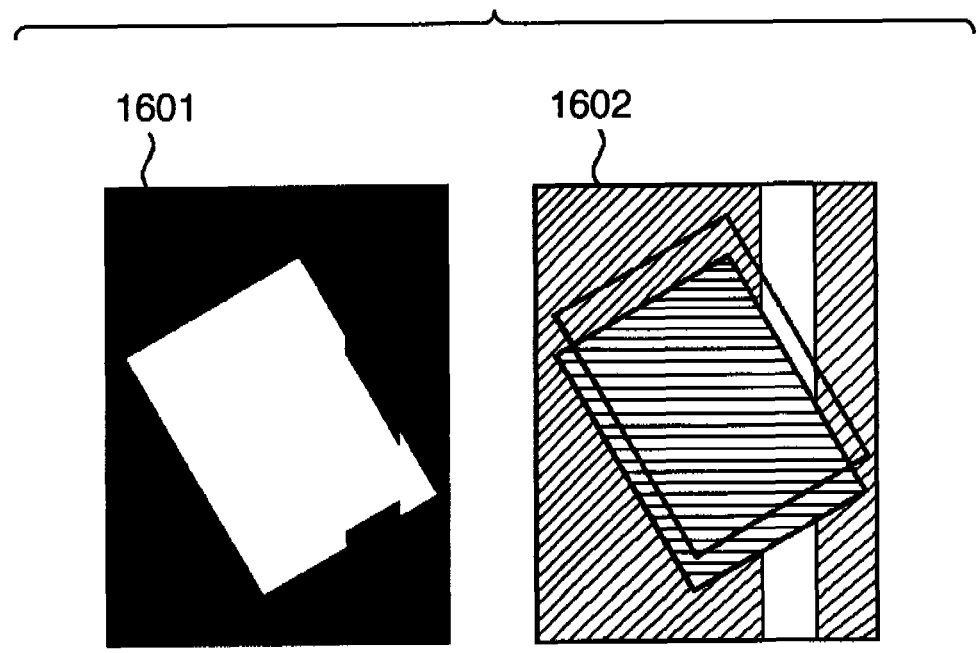
FIG. 16 is a view that depicts image processing executed by an image processing unit according to the third embodiment.

The third embodiment will be described below with reference to FIGS. 14 to 16. In this embodiment, a method for removing a shift between the reading position of a Light-on mode image read in an ON reading mode, and that of a Light-off mode image read in an OFF reading mode will be explained. The shift between the reading positions is caused by an external factor such as a control error or vibration. As a method for removing the shift between the reading positions, three methods will be described below.

<First Method>

The first method will be described. The first method corrects coordinates which associate a Light-on mode image and a Light-off mode image, in accordance with a shift between the reading position of the Light-on mode image and that of the Light-off mode image.

In some cases, for example, the reading position of a Light-on mode image and that of a Light-off mode image are always shifted from each other by a given amount by a driving unit, or the like. In this case, an image processing unit 112 in the first method stores a shift amount (dx, dy) in advance, and fills, with black, a pixel (x+dx, y+dy) in the Light-on mode image with respect to coordinates (x, y) at which external light is detected in the Light-off mode image when performing mask processing. With this processing, even if there is a shift between the reading position of the Light-on mode image and that of the OFF reading position, it is possible to remove the influence of external light from an image without inversely affecting an original document to be left.

<Second Method>

The second method will be explained next. The second method detects a shift amount between ON and Light-off mode images when reading the images. FIG. 14 shows an image reading apparatus which additionally includes a light source (partial light source) 1401 for detecting the shift amount between the reading positions, as compared with the image reading apparatus of FIG. 3. The light source 1401 is located near a original platen 11, as shown in FIG. 14. The light source 1401 emits light on part of a reading position at which an original document D is read. Note that components except for the light source 1401 are the same as in the first embodiment, and a description thereof will be omitted.

In the second method, the image processing unit 112 detects the position of the light source 1401 in each of the ON and Light-off mode images. FIG. 15 shows a Light-on mode image 1501 and an Light-off mode image 1502 which have been read by the image reading apparatus of FIG. 14. As shown in FIG. 15, the position of the light source 1401 in the Light-on mode image 1501 is different from that in the Light-off mode image 1502. That is, it is recognized that the reading positions in the ON and OFF reading modes have shifted from each other.

To remove the shift between the reading positions, the image processing unit 112 measures the coordinates of the light source in each of the ON and Light-off mode images before removing the influence of external light which has been described in the above embodiment. Assume that the coordinates of the light source in the Light-on mode image are represented by (x1, y1), and those of the light source in the Light-off mode image are represented by (x2, y2). Upon detecting external light in the Light-off mode image in mask processing, the image processing unit 112 associates the coordinates (x+x2−x1, y+y2−y1) in the Light-on mode image with the detected coordinates (x, y). In outputting, the image processing unit 112 obtains an image with no influence of external light or no shift between the reading positions by removing the reflection of the light source 1401 by, for example, extraction processing. In this method, the image processing unit 112 is an example of a partial light source specifying unit.

<Third Method>

The third method will be described next. The third method removes the shift between the reading positions of the ON and Light-off mode images using the result of detecting a document region. FIG. 16 shows image processing in the third method.

In the third method, when executing mask processing from the Light-off mode image, the image processing unit 112 determines, if there exists a pixel at which external light has been detected in the Light-off mode image, the pixels around this pixel fall within an external light region. Consequently, a region determined as an external light region is larger than the actual Light-off mode image. This can create a mask image encroaching on the document region like an image 1601 shown in FIG. 16.

The image processing unit 112 detects the document region using the image 1601, and also detects edges around the document region in an original Light-off mode image. At this time, if it is possible to detect edges whose brightness difference is sufficiently large, the unit 112 compares the detected coordinates with the document region like an image 1602 and calculates a distance between them, thereby specifying the shift between the ON and Light-off mode images. If edges are detected at two or more points, an average value is obtained, which is considered as a shift. The image processing unit 112 executes external light removal processing based on the obtained shift value. This makes it possible to avoid the document region from erroneously being filled with black even if the reading positions of the ON and Light-off mode images have dynamically shifted from each other. In this method, the image processing unit 112 is an example of an edge detection unit and region specifying unit.

As described above, the image reading apparatus according to the embodiment uses any of the above three methods to correct the shift between the reading positions of the ON and Light-off mode images. This allows the image reading apparatus according to the embodiment to decrease the influence of the shift between the reading positions in the ON and OFF reading modes due to an external factor such as a control error or vibration, thereby correctly removing the influence of external light.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-190396 filed on Aug. 19, 2009, No. 2010-058272 filed on Mar. 15, 2010 and No. 2010-139932 filed on Jun. 18, 2010, which are hereby incorporated by reference herein in their entirety.

What is claimed is:

1. An image reading apparatus comprising:
a original platen on which an original document is placed;
a light source configured to emit light toward the original document on said original platen;
a sensor configured to read an image of the original document on said original platen;
a reading unit configured to execute (i) a Light-on reading processing for turning on said light source and causing said sensor to read the original document on said original platen at a first resolution, and (ii) a Light-off reading processing for turning off said light source and causing said sensor to read the original document on said original platen at a second resolution;
an image processing unit configured to remove an influence of external light included at a reading position outside the original document in a Light-on mode image read by the Light-on reading processing, in accordance with an influence of external light included at a reading position outside the original document in a Light-off mode image read by the Light-off reading processing; and
a specifying unit configured to specify a boundary between an inside and an outside of the original document on said original platen based on a modified Light-on mode image in which said image processing unit has removed the influence of external light.

2. The image reading apparatus according to claim 1, wherein the Light-off reading processing reads the original document at the second resolution which is lower than the first resolution.

3. The image reading apparatus according to claim 1, wherein said image processing unit is further configured to convert the Light-on mode image read at the first resolution into an image with the second resolution, prior to removing the influence of external light from the Light-on mode image.

4. The image reading apparatus according to claim 3, wherein said specifying unit is further configured to specify a position and a size of the original document on said original platen based on the specified boundary between the inside and the outside of the original document.

5. The image reading apparatus according to claim 4, further comprising:
an adjustment unit configured to adjust the position and size of the original document specified by said specifying unit in accordance with a difference between the first resolution and the second resolution.

6. The image reading apparatus according to claim 4, wherein said specifying unit comprises:
a detection unit configured to detect an end portion of the read original document by determining, at two end portions of each line in a main scan direction of said sensor, whether there exists a pixel having a brightness equal to or greater than a predetermined threshold with respect to the modified Light-on mode image in which said image processing unit has removed the influence of external light, and specify the boundary between the inside and the outside of the original document on said original platen based on a detection result by said detection unit.

7. The image reading apparatus according to claim 1, wherein the specifying unit is further configured to specify coordinates of four corners of the original document from the modified Light-on mode image in which said image processing unit has removed the influence of external light.

8. The image reading apparatus according to claim 1, further comprising:
an opening/closing cover attached to said original platen so as to be openable/closeable, and configured to press the original document against said original platen; and
a detection unit configured to detect a state in which said opening/closing cover is closed or opened,
wherein when reading the original document on said original platen, said reading unit executes only the Light-on reading processing if said detection unit detects that said opening/closing cover is closed, and executes the Light-on reading processing and the Light-off reading processing if said detection unit detects that said opening/closing cover is opened.

9. The image reading apparatus according to claim 1, further comprising:
a setting unit configured to set a reading region for reading the original document,
wherein when reading the original document on said original platen, said reading unit executes only the Light-on reading processing if said setting unit has set the reading region, and executes the Light-on reading processing and the Light-off reading processing if said setting unit has not set the reading region.

10. The image reading apparatus according to claim 1, further comprising:

a unit configured to execute processing for flicker on at least one or more of the Light-off mode image obtained by the Light-off reading processing, the Light-on mode image obtained by the Light-on reading processing, and the modified Light-on mode image in which said image processing unit has removed the influence of external light.

11. The image reading apparatus according to claim 1, further comprising:
an opening/closing cover attached to said original platen so as to be openable/closeable, and is in contact with the original document on said original platen in a closed state,
said opening/closing cover comprises a front cover and a rear cover which are connected with each other, and is foldable in a direction in which surfaces of the front cover and the rear cover to be in contact with the original document come close to each other,
wherein when reading the original document in a state in which said opening/closing cover is opened, said image processing unit removes a reflection of a front end portion of the front cover.

12. The image reading apparatus according to claim 11, wherein if continuous regions each having a brightness equal to or higher than a predetermined threshold have a dimension equal to or less than another predetermined threshold in a sub-scan direction at two end portions in the main scan direction in the Light-on mode image, said image processing unit determines that the continuous regions include the reflection of the front end portion of the front cover, and removes the reflection in the continuous regions.

13. The image reading apparatus according to claim 1, further comprising:
a notifying unit configured to notify an operator, when reading the original document, that the original document is being read.

14. A control method for an image reading apparatus, comprising the steps of:
executing a Light-on reading processing for turning on a light source which emits light toward an original document on a original platen and causing a sensor to read an image of the original document on the original platen at a first resolution, and a Light-off reading processing for turning off the light source and causing the sensor to read the original document on the original platen at a second resolution;
removing an influence of external light included at a reading position outside the original document in a Light-on mode image read by the Light-on reading processing, in accordance with an influence of external light included at a reading position outside the original document in a Light-off mode image read by the Light-off reading processing; and
specifying a boundary between an inside and an outside of the original document on the original platen based on a modified Light-on mode image in which the influence of external light has been removed in the removing step.

15. A non-transitory computer-readable storage medium storing a computer program for causing a computer or a control unit of an image reading apparatus to execute the control method for the image reading apparatus according to claim 14.

16. The image reading apparatus according to claim 1, wherein said image processing unit comprises:
a correction unit configured to correct a shift between reading positions of the Light-on mode image and the Light-off mode image.

17. The image reading apparatus according to claim 16, wherein said correction unit comprises:
a storage unit configured to store, in advance, a shift amount between the reading positions of the Light-on mode image and the Light-off mode image which have been read by said reading unit, and correct the shift between the reading positions based on the shift amount stored in said storage unit before said image processing unit removes the influence of external light.

18. The image reading apparatus according to claim 16, further comprising:
a partial light source that is located near said original platen, and emits light toward part of the reading position, and
wherein said correction unit comprises:
a partial light source specifying unit configured to (i) specify a shift amount between reading positions at which light emitted from said partial light source is reflected in the Light-on mode image and the Light-off mode image which have been read by said reading unit, and (ii) correct a shift between the reading positions in accordance with the specified shift amount before said image processing unit removes the influence of external light.

19. The image reading apparatus according to claim 18, wherein said correction unit is further configured to remove the reflection of said partial light source in the Light-on mode image and the Light-off mode image.

20. The image reading apparatus according to claim 16, wherein said correction unit comprises:
an edge detection unit configured to detect edges of document regions in the Light-on mode image and the Light-off mode image, and
a region specifying unit configured to (i) specify document regions in the Light-on mode image and the Light-off mode image, which are obtained based on the edges detected by said edge detection unit, and (ii) correct the shift between the reading positions in accordance with the document regions in the Light-on mode image and the Light-off mode image before said image processing unit removes the influence of external light.

* * * * *